United States Patent Office 3,053,799
Patented Sept. 11, 1962

3,053,799
POLYMERIZABLE TRIAZINES AND
POLYMERS THEREOF
Gaetano F. D'Alelio, South Bend, Ind., assignor, by direct and mesne assignments, to Dal Mon Research Co., Cleveland, Ohio, a corporation of Delaware
No Drawing. Filed Apr. 22, 1959, Ser. No. 807,979
24 Claims. (Cl. 260—45.4)

This invention relates to a new class of organic compounds and to the methods for their preparation. More particularly, the invention relates to novel epoxy-substituted triazine compounds and to their preparation and utilization. More specifically, it deals with reactive epoxy-triazine derivatives suitable as monomers for the preparation of valuable polymeric products, and as stabilizing agents, tanning agents, lubricants, chemical intermediates, and for other uses.

Specifically, the invention provides new and particularly useful organic compounds which may be described as having a symmetrical triazine nucleus to which it is attached, as a substituent, at least one substituted epoxy group.

It is an object of this invention to provide a new class of s-triazine compounds. It is also an object of this invention to provide novel epoxy-substituted triazine compounds and methods for their preparation. It is also a further object of this invention to provide novel epoxy-substituted triazines which are useful and valuable in industry, particularly as stabilizers for halogen-containing polymers, such as for vinyl chloride and its copolymers. It is an object of this invention to provide new and useful chemical intermediates for the chemical industry as well as to provide a preparation for new compounds valuable as plasticizers, lubricants, and softening agents for other polymers and synthetic resins. It is also an object of this invention to provide improved polymerization products derived from said novel compounds containing epoxy groups.

It is a further object of this invention to provide new monomers from epoxy-substituted triazines as well as new polymers derived therefrom by polymerizing a mass comprising these new monomers containing at least one substituted epoxy (oxirane) group attached as a substituent to the triazine ring.

It is an added object of this invention to provide new and useful polymers as well as copolymers by polymerizing a mass comprising more than one new monomer of this invention, or at least one monomer of this invention with at least one other polymerizable compound, or with other types of epoxy-substituted compounds, such as the polyepoxy-reaction products of the bisphenols and epichlorohydrins.

Another object of this invention is to provide thermoplastic and thermosetting polymers.

These and other objects of this invention are accomplished by the novel compounds of this invention comprising triazine derivatives to which are attached specific substituted epoxy groups.

The compounds of this invention are represented graphically by the following general formula:

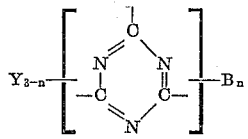

wherein $n$ represents an integer having a value of at least one and not more than three, Y is any monovalent radical, such as more fully illustrated hereinafter, and B is a specific substituted epoxy radical, also more fully described hereinafter. In each of the compounds of this invention there is at least one substituted epoxy group B attached to the triazine nucleus. Thus, when $n$ is one, Y is two; when $n$ is two, Y is one; and when $n$ is three, no Y groups are attached to the triazine ring.

When the trivalent symmetrical triazine nucleus,

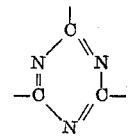

is represented by the symbol $(C_3N_3)$, the compounds of this invention can be represented as $Y_2(C_3N_3)B$, $Y(C_3N_3)B_2$, and $(C_3N_3)B_3$, or collectively as $$Y_{3-n}(C_3N_3)B_n$$

The versatility of these new compounds is outstanding because of the large number of substituted triazines which can be prepared readily. For example, when the triazine rings of this invention contain only one B group, the other two valencies of the triazine ring can be attached to two other identical Y groups, for example to two methoxy groups, —$OCH_3$; or to two amino groups, e.g. —$NH_2$; or to two substituted amino groups, e.g. $N(CH_3)_2$; or two different Y groups, for example an ethoxy group —$OCH_2CH_3$, and a methoxy group —$OCH_3$; or to an alkoxy group —OR, and an amino- or substituted amino-group $NR_2$, etc. Further diversification can be obtained in the variations possible in the substituted epoxy group itself, as for example, the epoxy group can be part of a three carbon chain, e.g.

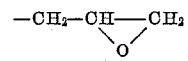

or an eight carbon atom chain

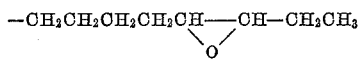

wherein the epoxy group is 5, 6 epoxy, or an isomer of the same chain wherein the epoxy group is in a different location as in a 4, 5 epoxy position, e.g.,

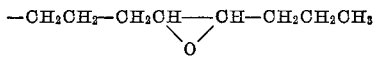

Still further diversification is obtained through the epoxy substituent, as for example when more than one oxirane or epoxy group is located in the structure of the substituent B as for example, in the structure

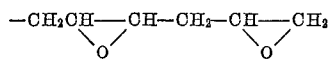

In other cases, where two B groups are attached to the triazine rings, these groups can be the same and contain, for example, only one epoxy group, or they can be different groups containing only one epoxy group each, or they can be different with one B group containing a single epoxy group and the other B group containing more than one epoxy group. In still other cases, wherein the triazine ring has three B groups attached to it, the B groups can be the same or different, thereby increasing the versatility of the new compounds of this invention.

The compounds of this invention polymerize readily. When these new epoxy compounds contain only one epoxy group and no other polymerizable or coreactive group, soluble, fusible polymers are obtained. When the compounds of this invention contain two epoxy groups, insoluble, infusible polymers can be prepared therefrom whether the two epoxy groups are located in a single B substituent group, or in two B substituent groups each containing an epoxy structure. Insoluble, infusible polymers are also obtained when the B substituent contains only one epoxy group and at least one Y group is polymerizable or is coreactive with the oxirane structure. Thus, in the compounds of this invention Y can be any polymerizable, or non-polymerizable monovalent radical attached to the triazine ring. For example, Y can be hydrogen and alkyl, aryl, aralkyl, alkaryl, cycloaliphatic and heterocyclic groups and their chloro, fluoro, alkoxy, aryloxy, acyloxy derivatives, such as methyl, ethyl, propyl, isopropyl, butyl, octyl, decyl, chloroethyl, fluoropropyl, cyclohexyl, cyclopentyl, phenyl, chlorophenyl, fluorophenyl, xenyl, naphthyl, tolyl, isopropyl phenyl, benzyl, phenethyl, phenyl propyl, acetoxy benzyl, ethoxy propyl, methyl naphthyl, vinyl, allyl, methallyl, allyl phenyl, etc., radicals; Y can also be hydroxyl and the alkoxy and aryloxy radicals derived from aliphatic, cycloaliphatic, aromatic and heterocyclic hydroxy compounds, such as methyl alcohol, ethyl alcohol, isopropyl alcohol, butyl alcohol, isobutyl alcohol, decyl alcohol, phenol, the o-, m-, and p-cresols, the xylenols, naphthols, ethylene glycol, methyl glycol ether, butyl glycol ether, glycerine, pentaerythritol, hydroxy naphthalene, hydroxy pyridine, as well as the alkoxy and aryloxy radicals of hydroxy acids and esters such as lactic acids, ethyl lactate, salicyclic acid, methyl salicylate; and in addition Y can be an amino group, $NH_2$ or the radical of a mono- or di-substituted amino group, for example, the radicals derived from ethyl amine, methyl amine, butyl amine, nonyl amine, dimethyl amine, aniline, naphthyl amine, ethanol amine, diethanolamine, diisopropanol amine, methyl aniline, piperidine, amino pyridine, hydrazine, symmetrical dimethyl hydrazine, unsymmetrical dimethyl hydrazine, as well as the radicals of the amino-acids, amino-amides, amino-nitriles, specific examples of which are:

—NHCH₂COOCH₃,  —N(CH₃)—(CH₂)₅COOCH=CH₂

—NHCH₂CON(CH₃)₂,  —NHCH₂CN
—NHC₆H₄CN,  —NHC₆H₄NHOCCH₃ the radicals of semicarbazides, such as semicarbazide itself, 4-methyl semicarbazide, etc., as disclosed in my U.S. Patent No. 2,295,565, issued September 15, 1942; the guanazo radical which is attached to the triazine ring by reacting dicyandiamide with a hydrazino triazine as shown in my U.S. Patent No. 2,295,567, issued September 15, 1942; the radicals of urea and substituted ureas, such as —NHCONH₂, CH₃NHCONH—, etc., which may be attached to the triazine ring as shown in my U.S. Patent No. 2,312,688, issued March 2, 1943; radicals of aminoaryl sulphonamides, e.g. —NHC₆H₄SO₂NH₂, —NHC₆H₄SO₂NHCH₃, etc., as shown in my U.S. Patent No. 2,312,697, issued March 2, 1943; radicals of acyl hydrazine and substituted hydrazines, such as

CH₃CONHNH—, C₂H₅CONHNC₆H₅—

C₆H₅SO₂NHNH₂, etc.; radicals of alkylene amines, such as:

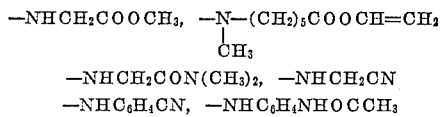

Y can also be the polymerizable radical of the acrylic, methacrylic, chloracrylic ester or amide of amine alcohols or dialcohols and diamines, e.g.,

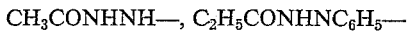

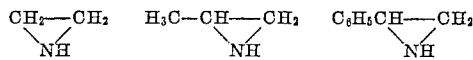

etc.; the radicals of polymerizable aminated or hydroxylated alkylene aryl compounds, for example,

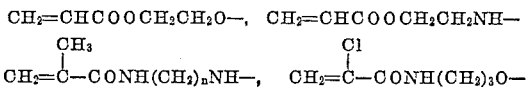

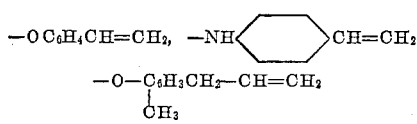

etc.; the radicals of malonic and substituted malonic esters, nitriles and amides, e.g.,

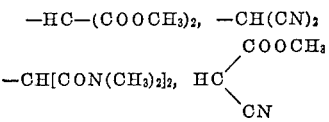

etc.; the

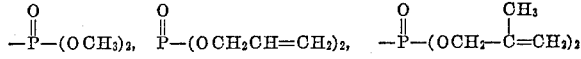

radical such as

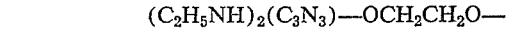

etc., or a triazine ring, e.g., $(CH_3NH)_2C_3N_3$—, or through a bridge, such as $(CH_3)_2N_2(C_3N_3)NH$—$CH_2CH_2NH$—, $(C_2H_5NH)_2(C_3N_3)$—$OCH_2CH_2O$—

$(HO)_2(C_3N_3)NHCH_2CH_2O$—, etc., or the group can represent the remainder of the molecule, to yield, for example, compounds of the structure

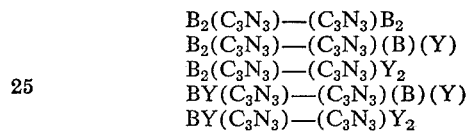

as well as those structures linked through carbon atoms, sulfur atoms, oxygen atoms, etc., as, for example,

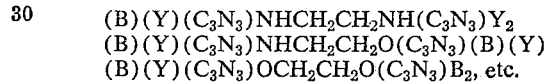

Y can also be such groups as —OH, —Cl, —Br, —F, —CN, —COOR, $CONR_2$, as well as the B group. When one of Y groups attached to the triazine ring contains a polymerizable ethylenic group, not inhibited by other groups or atoms in the monomer, polymers as well as copolymers can also be prepared with other monovinyl or monovinylidene monomers to produce modified thermoplastic compositions which can be converted to the insoluble, infusible state by further polymerization through the epoxy group and are useful in molding, laminating, casting, coating, and adhesive applications, and for other purposes. Insoluble, infusible polymers are also obtained by copolymerization with polyvinyl compounds. These polymers can be prepared by polymerizing a mass comprising the vinyl-substituted monomers of this invention, and can be modified by copolymerization with at least one other polymerizable compound containing the structures or groupings

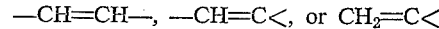

such as the unsaturated alkyd resins, the acrylic and alkacrylic acids and their derivatives, such as their esters, amides and corresponding nitriles, for example, acrylic acid, methyl acrylate, butyl acrylate, allyl acrylate, ethylene glycol diacrylate, acrylonitrile, methacrylonitrile, methacrylic acid, methyl methacrylate, etc.; the itaconic acid monoesters and diesters, such as the methyl, ethyl, phenethyl, allyl, dimethallyl, the maleic and fumaric acid monoesters, diesters and their amide and nitrile compounds, such as, ethyl allyl maleate, fumaryl dinitrile, dimethallyl fumarate, etc.; the ethers, such as vinyl phenyl ether, methallyl allyl ether, vinyl allyl ether, vinyl methallyl ether, allyl crotyl ether, vinyl crotyl ether, hydroquinone divinyl ether, propargyl allyl ether, divinyl methyl glyceryl ether, etc.; the aryl ethylenes, such as, styrene, p-methyl styrene, the o-, m-, and p-divinyl benzenes, vinyl naphthalene, diallyl naphthalene, dimethallyl carbazole, vinylpyridine, etc.; the polyolefins and their polymerizable derivatives, such as, phenyl butadiene, chloroprene; low molecular weight polymers, such as, the dimers, trimers, tetramers, etc. of butadiene, isoprene, etc.; cyanuric acid derivatives, such as diallyl cyanurate, triallyl cyanurate, trivinyl cyanurate, or, in general, triazine compounds having at least one polymerizable or copolymerizable unsaturated group attached directly or indirectly to the triazine ring; as well as the partial, soluble, or fusible polymers of the hereinabove listed monomers, etc.

Additional examples of comonomers are the vinyl esters, such as the acetate, propionate, stearate, fluoride, bromide, chloroacetate, etc., vinyl ketones, methyl vinyl ketones etc. Polymerization can be effected by free-radical generating catalysts, such as benzoyl peroxide, or by anionic or cationic catalysts.

When one of the Y groups attached to the triazine ring contains a reactive —NH or NH$_2$ grouping, the compound can be condensed with aldehydes and ketones, such as formaldehyde, acetaldehyde, propionaldehyde, acrolein, glyoxal, acetone, ketone, diketone, etc., alone or in the presence of other aldehyde-reactable compounds, such as urea, thiourea, methyl urea, hydroxyethyl urea, dicyanadiamide, quanidine, biguanidine, amino-triazales, triaminotriazine, tri(methylamino)triazine, ethylene diamino, phenylene, diamine, aminophenol, monoaminoguanazole, diaminoguanazole, diaminophenylguanazole, phenol, cresols, phenylphenol, p,p'-dihydroxydiphenylpropane, polyvinyl alcohol, polyacrylamide, polyethyleneimine, etc.

Particularly, however, this invention is concerned with triazine compounds containing substituted epoxy groups in which B of the above formula represents the structure

—A—Z—X wherein A represents —O—, —S—, and —NR—, in which R represents hydrogen and a hydrocarbon radical, such as alkyl, aryl, alkaryl, aralkyl, etc. radicals; Z represents a divalent aromatic hydrocarbon radical, and X is an epoxy substituted alkyl radical. Thus, the compounds of this invention have the formula:

$$Y_{3-n}(C_3N_3)(-A-Z-X)_n$$

Illustrative examples of such compounds are:

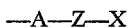
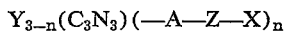
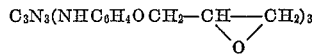
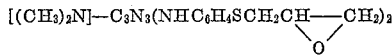
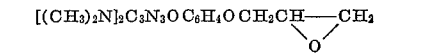
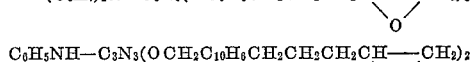
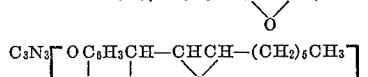
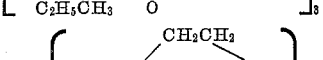
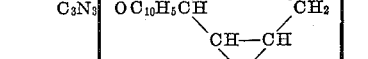
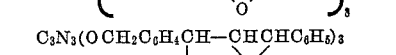
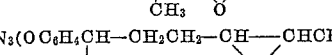
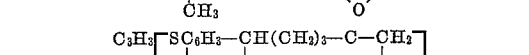
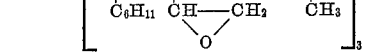
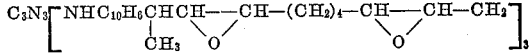
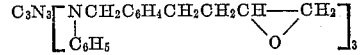
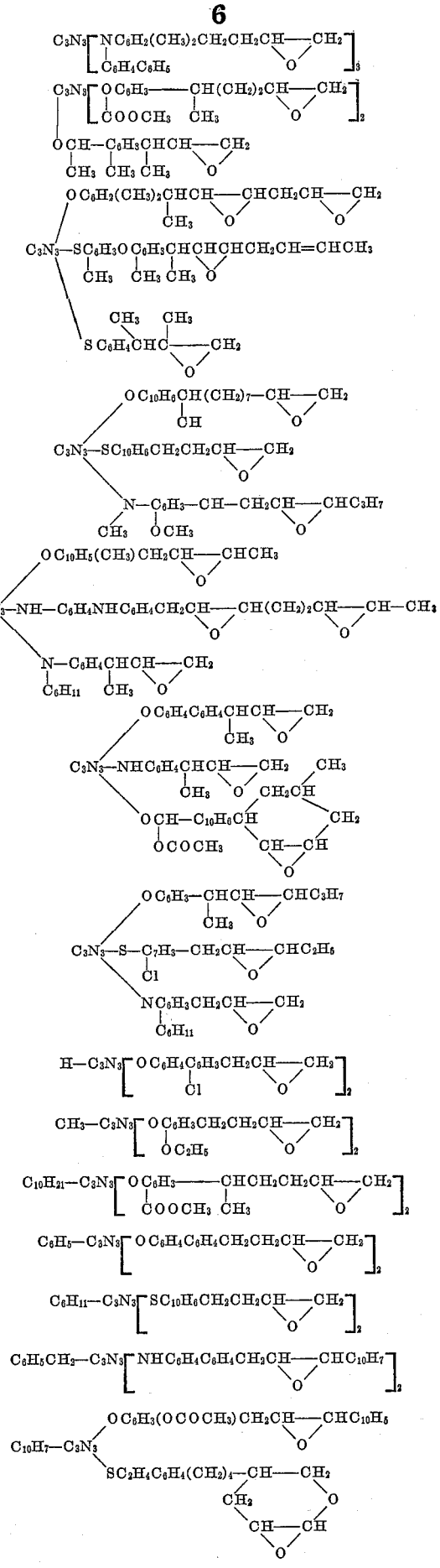

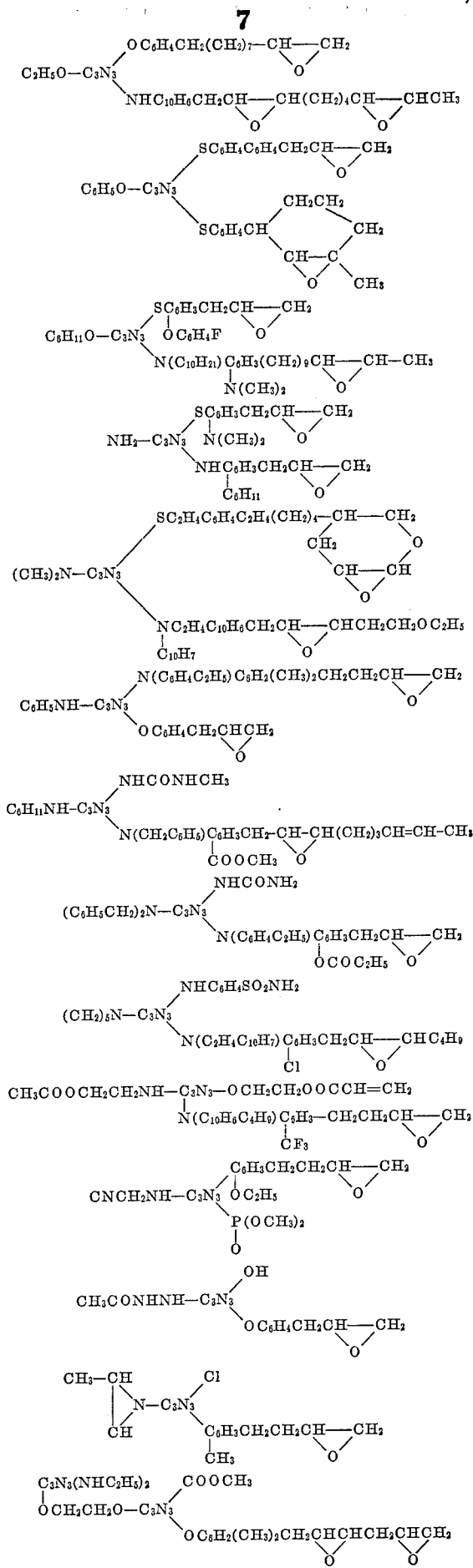

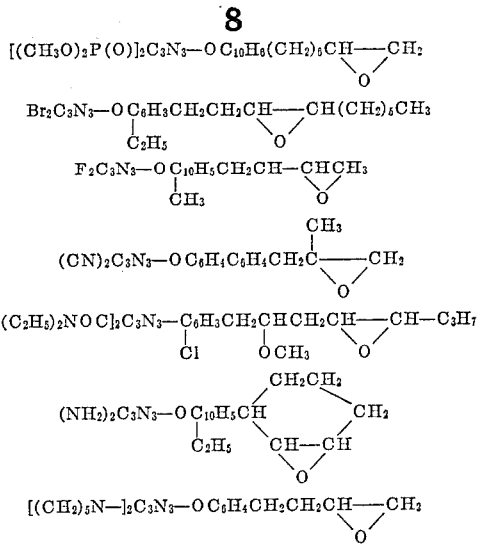

In the triazine monomers of this invention, Z represents a divalent aromatic radical, predominantly hydrocarbon, having an aryl nucleus between said valencies including aralkylene and alkarylene, which groups can have substituents such as chloro, fluoro, alkoxy, aryloxy, acyloxy, etc. groups.

Illustrative examples of such divalent radicals include:

$-C_6H_4-$; $-C_6H_3-$; $-C_6H_2(CH_3)_2-$; $-C_{10}H_6-$; $-C_{10}H_5-$;
                                                                    $|$
                                                                   $CH_3$ $-C_6H_3-$; $-C_6H_4-C_6H_4-$; $-C_6H_3-$; $-C_6H_4-C_6H_3-$;
  $|$                            $|$         $|$      $|$
 $C_2H_5$                        $Cl$        $Cl$    $Cl$ $-C_{10}H_5-$; $-C_6H_3-$; $-C_6H_3-$; $-C_6H_4CH_2-$;
   $|$           $|$          $|$
  $C_2H_5$     $COOCH_3$    $OCOCH_3$ $-CH_2C_6H_4CH_2-$; $-CH-C_6H_3-$; $-CH-C_{10}H_6-$; $-CH_2C_6H_3-$;
                      $|$    $|$       $|$               $|$
                     $CH_3$ $CH_3$   $OCOCH_3$         $OCH_3$ $-C_6H_4NHC_6H_4-$; $-C_6H_4OC_6H_4-$; $-C_6H_4SC_6H_4-$;

$-C_6H_3NHC_6H_3-$; $-C_6H_3OC_6H_3-$; $C_6H_3-$; $-C_6H_3-$;
   $|$      $|$       $|$      $|$     $|$  $|$    $|$   $|$
  $CH_3$  $CH_3$    $C_2H_5$ $C_2H_5$ $OC_6H_4F$ $N(CH_3)_2$ $-C_6H_3-$; $-C_6H_3-$;
  $|$         $|$
 $NHC_6H_5$  $N(CH_2C_6H_5)_2$ etc.

The substituent groups such as the alkoxy, aryloxy, acyloxy, alkyl amino, aryl amino, etc. radicals are advantageously radicals of no more than about ten carbon atoms, such as methoxy, ethoxy, butoxy, pentoxy, octoxy, propionoxy, butyroxy, valeroxy, capryloxy, benzoxy, phenylacetoxy, toluoxy, etc. Other groups, such as nitroso, nitro, etc., can also be used as substituent groups on the Z group, provided they are inert during the preparation and use of the monomer. Any portion of the Z group which is aliphatic can be saturated or unsaturated, e.g., $-CH_2-CH=CH_2$, $-CH_2CH=CH-CH_2-$, $-C\equiv C-$ etc. Also, without departing from the spirit of this invention, the carbon atoms in the divalent radical Z, can be interrupted by an atom other than carbon, e.g.

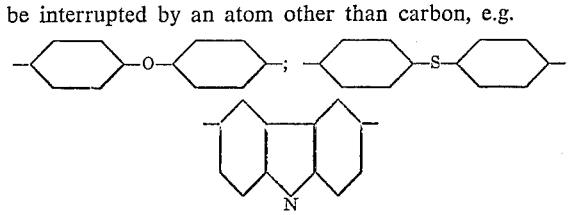

etc.

While other hydrocarbon and substituted hydrocarbon groups are also effective as Z groups, the groups indicated above are preferred for reasons of availability and economy.

A few illustrative examples of the structures of the epoxy alkyl group, X, are:

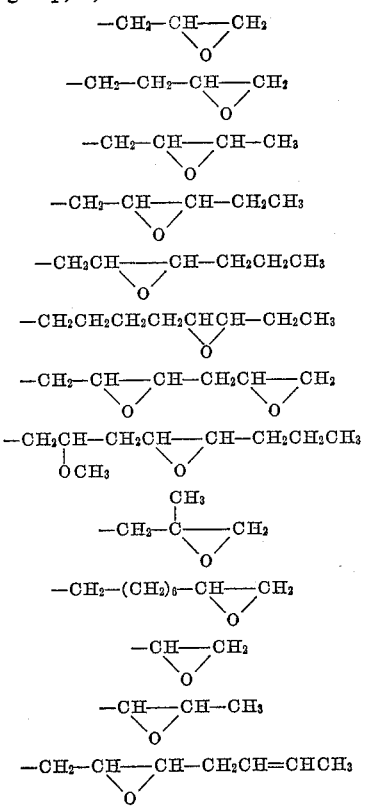

The epoxy-substituted alkyl groups, X, attached to the triazine nucleus comprise those alkyl groups having a 1,2-epoxy group; that is, a

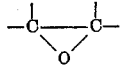

structure, in the alkyl group, containing from 2 to 20 carbon atoms in the alkyl group which can be saturated, unsaturated, branched, or unbranched and open-chain as indicated in the structures hereinabove. Particularly preferred alkyl radicals are the monoepoxy-substituted alkyl groups containing from 2 to 8 carbon atoms and having an epoxy in the terminal position. Typical examples of the epoxy alkyl groups include the folowing:

2,3-epoxy propanyl-1,
3,4-epoxy butanyl-1,
3,4-epoxy decanyl-1,
3,4-epoxy dodecanyl-1,
2-methyl-2,3-epoxy propanyl-1,
2,3-cyclohexanyl-1,
2,3-epoxypentanyl-1,
5,6-epoxyhexanyl-2,
9,10-epoxyoctadecanyl-1,
2,3-epoxy-3-phenyl propanyl-1,
1,2-epoxy-3,7-dimethyl octene-7-yl-3,
6,7-epoxy-3,7-dimethyl octene-2-yl-1,
1,2-epoxy-2,3,3-trimethyl-1-(2-methyl propanyl-2)cyclopentanyl-4,
2-(2,3-epoxypropyloxy)-ethanyl-1,
4-(2,3-epoxy-dihydropyranyl-5)-butanyl-1,
4-chloro-2,3-epoxybutanyl-1,
3-epoxy ethyl-5-methoxy-cyclohexanyl-6,
12-(2,3-epoxypropyloxy)dodecanyl-1, As indicated hereinabove the symbol A represents —O—, —S—, and —NR—, in which R represents hydrogen and hydrocarbon monovalent radicals, including derivatives of the latter as indicated below. For example, R can be hydrogen and alkyl, aryl, aralkyl, alkaryl cyclo- aliphatic and heterocyclic groups and their chloro, fluoro, alkoxy, aryloxy, acyloxy derivatives, such as methyl, ethyl, propyl, isopropyl, butyl, octyl, decyl, chloroethyl, fluoropropyl, cyclohexyl, cyclopentyl, phenyl, chlorophenyl, fluorophenyl, xenyl, naphthyl, tolyl, isopropyl phenyl, benzyl, phenethyl, phenyl, propyl, acetoxy benzyl, ethoxy propyl, methyl naphthyl, vinyl allyl, methallyl, allyl phenyl, etc. radicals.

SYNTHESIS

The novel compounds of this invention can be prepared by a number of methods. For example, they can be prepared by epoxidizing unsaturated triazine derivatives, as for example by epoxidizing monomethoxy-4,6-diallyloxy-S-triazine. The epoxidation of the unsaturated compounds is performed advantageously by reacting the unsaturated compound with an epoxidizing agent at a temperature between about —20° C. to 50° C., preferably under anhydrous conditions. Effective epoxidizing agents for this type of reaction are organic peracids, such as peracetic acid, perbenzoic acid, monoperphthalic acid, as well as acetaldehyde monoperacetate, and the like. The peroxidation is preferably carried out in a suitable mutual solvent for the products of the reactants. A number of solvents can be used, such as chloroform, ethyl, ether, dichloromethane, benzene, ethyl acetate, and the like, and the choice of the solvent depends on the product being synthesized.

The synthesis of the compounds of this invention can be illustrated as follows:

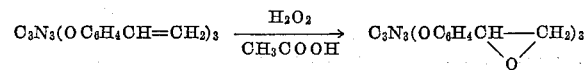

The equation can be generalized as follows:

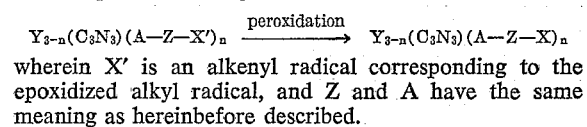

wherein X′ is an alkenyl radical corresponding to the epoxidized alkyl radical, and Z and A have the same meaning as hereinbefore described.

The novel compounds of this invention can also be prepared by reacting the corresponding cyanuric halide with the appropriate substituted epoxy intermediate, e.g.,

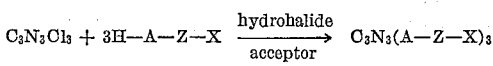

This equation can be generalized as follows:

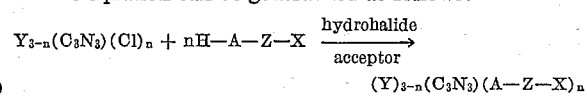

wherein H is hydrogen and Y, A, Z, and X have the same meaning as hereinbefore described.

This type of reaction can be carried out in a wide choice of medium by allowing the halotriazine to contact the epoxy-intermediate in the solvent, such as benzene, toluene, water, dioxane, acetone, or the like, in the presence of the hydrohalide acceptor, and at the lowest temperature possible to avoid polymerization of the resulting product, if the monomer is desired. The reactants can conveniently be employed in stoichiometric quantities although in some cases a slight or a large excess of the less costly reagent may be used to insure higher conversions. In the reaction of the halotriazine and the epoxy-intermediate, the hydrohalide acceptor preferably should be one that will not react with either the halotriazine or the epoxy group or cause polymerization of the epoxy-substituted triazine if monomeric materials are desired.

In introducing groups, other than the epoxy groups, into the triazine ring, such as a non-reactive methoxy group by reaction of the halotriazine and methyl alcohol, reactive hydrohalide acceptors, such as sodium hydroxide, potassium hydroxide, lithium hydroxide, calcium hydroxide, and their bicarbonates and carbonates can be used. In the preparation of the epoxy-substituted triazine, if monomeric materials are desired, the hydrohalide acceptors preferably are weak inorganic bases and tertiary amines, such as triethyl amine, tributyl amine, pyridine, and the like. Upon completion of the reaction the product can be removed by filtration if it is a solid, or by decantation if it is an oil. Salts formed by the reaction between the hydrohalide and the acceptor can be removed by filtration or equivalent means, by having the reaction carried out in a medium, such as a hydrocarbon, in which the salt is insoluble. Also, after isolation, the water insoluble epoxy-substituted triazine can be washed with water to remove salt impurities.

In the practice of this invention it is not necessary to isolate the monomeric product, but the polymeric product can be prepared, in many cases, directly if desired. For example, the reaction between a dihalotriazine or a trihalotriazine and an epoxy-intermediate can be carried out in the presence of a strong alkali, with a slight excess of that required stoichiometrically, whereby the epoxy-substituted triazine is formed, and under the reaction conditions, a polymer product formed by polymerization of the oxirane groups is obtained. In other cases, polymerization can occur between an epoxy group as it is substituted on the ring and another reactive group, such as an —NH$_2$ group already on the ring.

In other cases the monomeric epoxy-substituted triazine can be isolated as such and later polymerized and copolymerized. The halotriazines used in the practice of this invention can be any of the halotriazines but are preferably the bromo- and chloro-triazines. For economic reasons, the chlorotriazines are preferred.

The novel compounds of this invention are either substantially colorless liquids, or solid or semi-solids and are soluble in a wide variety of solvents, depending on the substituents, attached to the triazine ring. They are soluble in many oils and solvents and show compatibility with many polymers, such as vinyl chloride polymers and copolymers, as well as with polymerized oxirane compounds. They also act as stabilizing agents for chlorine and halogen containing polymers.

The products of this invention are especially useful in the preparation of commercially valuable polymerization products. They can be polymerized by themselves or with other epoxy-monomers or polymers. The homopolymers of the mono-epoxy-substituted triazines of this invention, when they contain no other reactive group on the ring, can be polymerized to substituted linear polyethers by catalysts such as zinc chloride, sodium hydroxide, tertiary amines, etc. About 1–5 percent of the catalyst is usually sufficient to produce polymers using a temperature in the range of 0°–100° C.

Epoxy-substituted triazines containing at least two oxirane groups, or one oxirane group and another reactive group attached to the ring, are more readily polymerized, and in most cases produce thermosetting polymers. In some cases where another reactive group is attached to the triazine ring together with at least one epoxy group, heat alone is sufficient to produce polymers. In those monomers that contain either two epoxide groups and no other reactive group, or three epoxide groups, polymerization products can be obtained by treating with a large variety of catalysts, such as aluminum chloride, boron trifluoride; amine catalysts, such as ethyleneamine, diethyleneamine, pyridine, piperidine, the phenylene diamines, aminealdehyde condensation products, and the amide-aldehyde condensation products, such as the condensation of formaldehyde with amines and amides, such as aniline, aminophenols, urea, thiourea, semi-carbazide, amino-triazines, and amino-diazines, hydroxyureas, etc.; the polyisocyanates, such as phthalic, terephthalic, oxalic, succinic, and the like. The amount of catalyst used will depend on the nature and activity of the catalyst, the specific epoxy-substituted triazine and the temperature conditions used, but in most cases the amount of catalyst will vary from 0.1 percent to about 5 percent by weight of the epoxy compound. A wide range of temperature can be used in polymerizing the epoxy-substituted triazines of this invention, for example, from —10° C. to about 150° C. or higher, and more preferably between 20° C. and 120° C.

The epoxy-substituted triazine of this invention can be polymerized alone or copolymerized with other polymerizable materials. Two or more different epoxy-substituted triazines can be copolymerized together. Also, one or more epoxy-substituted triazines can be copolymerized with other kinds of epoxy containing compounds, such as ethylene oxide, propylene oxide, epichlorohydrin, glycidol, butadiene monoxide, butadiene dioxide; epoxyethers, such as the diglycidyl ethers of dihydric phenols, such as resorcinol, catechol, p,p'-dihydroxy-diphenyl-propane - 2; p,p' -dihydroxy - diphenyl - methane; poly-epoxy-polyethers, such as are obtained by reacting under alkaline or acid conditions a polyhydric alcohol, such as ethylene glycols, glycerol, pentaerythritol and a halogen-containing epoxide, such as epichlorohydrin; mono- and di-esters of epoxy-alcohols, such as 2,3-epoxy-propylacetate, di(2,3-epoxy-propyl) phthalate, glycidyl acrylate, glycidyl crotonate, and similar compounds.

The soluble, fusible polymers prepared from the epoxy-substituted triazines of this invention can be used in the preparation of coating compositions, impregnating compositions, viscosity improvers for lubricating oils and greases, as textile sizings, plasticizers and mold lubricants for other polymers, in the manner in which such compositions are generally used, and for other uses.

The thermosetting homopolymers and copolymers of this invention are insoluble, infusible materials, and are useful as adhesives, castings, and potting compounds, for the preparation of laminated products and molded compounds. The partially polymerized products of these epoxy-substituted triazine containing a plurality of epoxy groups can be converted to other derivatives by reaction with fatty acids and especially drying oil fatty acids, such as oleic, lineoleic, linolenic acid, etc., for the preparation of drying oil composition. The epoxy-substituted triazines can also be used as chemical intermediates by reaction with other compopnds, for example, with acetic acid and/or acetic anhydride to produce the diacetate corresponding to the dialcohol of the oxirane linkage. In general, these epoxy-substituted triazines can be reacted with water to produce the corresponding glycols, or with organic compounds containnig one or more active hydrogens, such as the alcohols, the acids, the amines, the phenols, etc., e.g. ethyl alcohol, succinic acid, aniline, phenol, and the like by reacting in the presence of an acid or alkaline catalyst. These reactive hydrogen compounds can also be polymeric, such as cellulose, polyvinyl alcohol, phenol-formaldehyde resins, the polyethylene amines, caprolactam polymers, polyamides, saturated and unsaturated polyesters, alkyd resins, such as glyceryl phthalate, and oil-modified glyceryl phthalates and the like.

The invention will be more fully described by the following examples. This invention is not to be regarded, however, as restricted in any way by these examples and they are used merely as means of illustration and not by way of limitation. In these examples, as well as throughout the specification, "parts" and "percentages" shall mean parts by weight and percentages by weight unless specifically provided otherwise.

PREPARATION OF THE MONOMERS

*Synthesis A*

The preparation of the monomers of this invention is illustrated specifically by the synthesis of

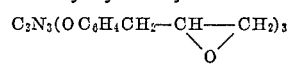

To a mixture of 18.4 parts of cyanuric chloride, 56 parts of tributyl amine and 100 parts of water cooled to 2°–5° C., in a flask equipped with means for heating and stirring, is added slowly and with stirring 45 parts of para-(2,3-epoxypropyl)-phenol. Upon completion of the addition, the reaction is allowed to proceed for one hour at room temperature, after which the mixture is refluxed for 1 to 2 hours and then allowed to cool to room temperature. The product is washed with water to remove byproduct amine hydrochloride and dried under reduced pressure. Ultimate analyses for carbon, hydrogen, nitrogen, and molecular weight give values of 68.4%, 5.21%, 7.96%, and 526.4, all of which are in close agreement with the theoretical values. By difference the oxygen content is 18.43%, which agrees closely with theoretical.

The theoretical content of the oxirane oxygen is 9.15% and the actual value will depend on the degree of conversion of the monomer to polymer varying from the theoretical value to lower values approaching zero; for example, the theoretical value may be lowered by continued reflux during the condensation of the halotriazine derivative with the epoxy compound, or by the use of higher quantities of hydrohalide acceptor, or by the use of other hydrohalide acceptors, such as sodium hydroxide, or simply by heating the isolated intermediate or resin alone or with alkalis, acids, or salts, or with other coreactive ingredients.

When, instead of the (2,3-epoxypropyl)-phenol, another epoxy compound is used corresponding to the formula H—A—Z—X as previously defined hereinabove, then the corresponding triazine derivative is obtained, as for example, when

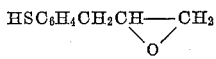

is used in equivalent amount, instead of the (2,3-epoxypropyl)-phenol, then

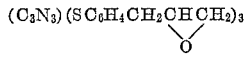

is obtained.

Synthesis B

This method illustrates the peroxidation method of preparing the new compounds of this invention.

To 47.7 parts of 2,4,6-tris(p-allylphenoxy)-1,3,5-triazine in 150 parts of hexane is added 55 parts of 45% peracetic acid prepared according to the procedure of Industrial and Engineering Chemistry, 39, 847 (1947). The reaction mixture is allowed to stand at room temperature for 24 hours and then at 40°–50° C. for 3 hours. Thereafter, it is washed with two 100-part portions of water, dilute sodium carbonate solution, and again with water. The hexane is removed at reduced pressure and there is isolated the epoxy derivative corresponding to that prepared in Synthesis A.

Instead of the specific peroxidation method illustrated in this example, which is known as the preformed peracid method, other peroxidation techniques can be used which are well known in the art, such as the in-situ method using formic or acetic acid and hydrogen peroxide with sulfuric acid, alkane sulfonic acids, or ion-exchange resins containing sulfonic groups, the acetaldehyde monoperacetate method, the tungstic acid-hydrogen peroxide method, etc.

As indicated in the previous synthesis, the substitution of other triazine derivatives for $$C_3N_3(OC_6H_4CH=CH_2)_3$$

of this example will produce the corresponding compound, for example, $(CH_3)_2N-C_3N_3(OC_6H_4CH=CH_2)_2$ will produce

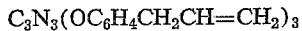

or in general, compounds of the formula $$(Y)_{3-n}(C_3N_3)(D-Z-X')_n$$

will yield products of the formula $$(Y)_{3-n}(C_3N_3)(D-Z-X)_n$$

as previously described hereinabove, wherein X' is an alkenyl group corresponding to the epoxy-containing group X.

While there is a great variety in the types of monomers covered by this application, it will be simple enough for any chemist to select which of the above types of preparation is best suited for preparation of a particular monomer. Once a monomer of this invention has been selected, it is well within the skill of any chemist to determine what intermediates would be best suited for its preparation according to the above procedures, how to prepare them, if not easily available, and how to combine them according to well known standard chemical reactions. For example, when the groups to be added to a triazine nucleus are different, it would be obvious for a chemist to react a cyanuric chloride first with the stoichiometric amount of one intermediate that would attach the first group, then with the stoichiometric amount of a second intermediate that would react to attach the second group, and then with the stoichiometric amount, or slight excess of a third intermediate to supply the third group, each reaction being promoted by the well-known conditions for effecting each type of condensation. Depending on the availability or ease of preparation of the intermediates, it is generally advantageous to assemble chemical groups in an intermediate in such a manner that one condensation reaction will effect the attachment for each respective side group to the triazine nucleus. However, the desirability of step-wise attachment is within the skill of any chemist to determine.

By the procedures indicated above, the following compounds are prepared for use hereinafter in the following examples.

Monomer:

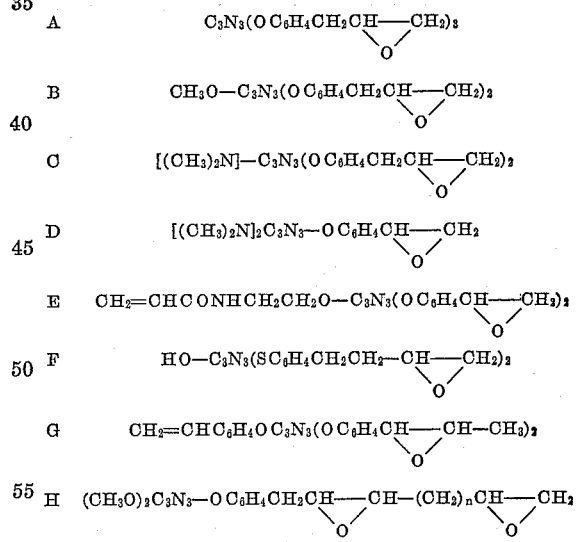

EXAMPLE I

This example illustrates the conversion of the monomers of this invention to polymers with alkaline or acid substances or with active salts. Ten parts each of monomers A to H inclusive are mixed respectively with one to two parts of sodium hydroxide, calcium hydroxide, potassium hydroxide, aluminum chloride, boron fluoride etherate, phthalic anhydride, and succinic acid, respectively. The temperature is varied in each case, using 20° C. for A; 40° C. for B; 60° C. for C; 80° C. for D; 100° C. for E; 120° C. for F; 140° C. for G; and 150° C. for H.

EXAMPLE II

Ten parts of monomer A are added to 50 parts of dioxane containing 0.1 part NaOH and the mixture heated at 60 C. to polymerize the monomer and give an increased viscosity. Continued heating results in a cross-linked gel.

If desired, the heating can be discontinued before gellation to give a partial polymer. Gellation can be retarded considerably by using a mixture of monomers, for example by using a mixture of monomers H and D. Instead of monomer D, other oxirane compounds, such as styrene oxide, or epoxidized methyl oleate can be used.

EXAMPLE III

Instead of polymerizing a single triazine monomer, a mixture of equal parts of monomers A and B are mixed together and five parts of p,p'-diaminodiphenyl sulfone are added to each 100 parts of the mixture and the mixture molded at 100° C. to produce a product which is less brittle than when monomer A is used alone. A more flexible product is produced when monomer B in the above formulations is replaced by monomer D which has only one exirane linkage.

EXAMPLE IV

Example III is repeated using monomer A and the diepoxy compound

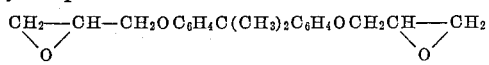

instead of monomer B, and a copolymer is obtained comparing favorably with the properties of the copolymers of Example III.

EXAMPLE V

One mole of monomer A is heated with 3 moles of acetic anhydride to produce a composition comprising substantially the hexa-acetate of the monomer due to the opening of the oxirane rings, represented as

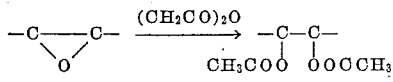

Reaction with alcohols, amides, amines, mercaptans, ammonia, hydrogen, cyanide, phenols, antimony trichloride, arsenic trichloride, ethyleneimine, etc., achieves similar opening of the oxirane rings.

EXAMPLE VI

Twenty-five parts of monomer G are dissolved in a mixture of 50 parts of acetone and 50 parts of dioxane containing 0.25 part of benzoyl peroxide and the mixture refluxed for 24 hours to produce a polymer containing polymerizable oxirane groups. One part of dicyandiamide is added to the solution. Films are case, the solvent evaporated at 70°–80° C. and the film cured at 125° C. for one-half hour to yield a product insoluble in benzene, chloroform, acetone, dioxane, and other active organic solvents.

Instead of producing a homopolymer, a copolymer can be prepared by using at least one other monomer containing a $CH_2=C<$, a $CH_2=CH-$, or a

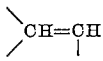

linkage, such as styrene, vinyl acetate, ethyl methacrylate, maleic anhydride, acrylonitrile, etc., for example:

A mixture of 20 parts of styrene, 5 parts of monomer G, 0.25 part of benzoyl peroxide in 100 parts of acetone, is polymerized by reflux for 24 hours, then allowed to cool and methanol added to precipitate the polymer which is dried under reduced pressure. Ten parts of the polymer are mixed with one part of phthalic acid and the mixture molded at 2,000 pounds per square inch at 130° C. to produce a water-resistant, solvent-resistant, and heat-resistant composition. Dicyandiamide, or p,p'-diaminodiphenyl sulfone is used in place of the phthalic acid to give similar results.

EXAMPLE VII

A 30 percent solution is prepared from monomer H in a solvent mixture of equal parts of dioxane and acetone, to which is added two parts of 4,4'-diamino-diphenyl sulfone. Paper sheets are impregnated with the resin solution and dried at 75°–90° C. to remove solvent between impregnations until a content of 65 percent resin is obtained in the sheet. Multiple 5 x 5 inch sheets are superimposed and the assembly pressed between stainless steel platens in a press at a temperature of about 150° C. at 5,000 pounds per square inch for 30 minutes. The laminated sheet has a hard, abrasive-resistant surface and excellent boiling water resistance, which is lower than a comparable laminate produced with triglycidyl cyanurate.

EXAMPLE VIII

Forty parts of acrylic acid, 400 parts of butyl acrylate, 1,000 parts styrene, 1,500 parts amyl acetate, and 25 parts of cumene hydroperoxide are refluxed for 5 to 7 hours. To this solution there is added 500 parts of monomer A. A film is cast from the mixture and baked at 325° F. for 30 minutes. The cured film has greater mar resistance than a comparable film prepared with triglycidyl cyanurate.

Excellent results are also obtained when monomers B, C, E, F, G, and H, respectively, are used instead of monomer A.

EXAMPLE IX

This example illustrates the preparation of foams using the new compounds and polymers of this invention. 70 parts of monomer B, 15 parts of polyethylene polyimine, 0.75 part of diazo aminobenzene, 0.1 part of hexane are mixed together and heated at 200°–230° F. to produce a foam having approximately ten times the original volume of unfoamed material and a compressive strength of over 150 pounds per square inch. Similarly, foams are prepared by the use of monomers A, C, E, F, G, and H, respectively.

EXAMPLE X

Fifty parts of monomer A, 300 parts of soyabean fatty acids are esterified in 5 hours at 100°–225° C. with continuous removal of water using xylene as an azeotroping agent. As a drier there is added 0.05 percent cobalt naphthenate. A film cast on glass test panel is allowed to air dry for five days and then tested in a weatherometer. At the end of seven days exposure, the film is essentially colorless, in contrast to intense yellowing of another film prepared from the reaction product of the soyabean fatty acids and the epichlorohydrin derivative of bis-phenol.

Similar results are obtained when monomers B, C, E, F, G, and H, respectively, are used instead of monomer A.

EXAMPLE XI

Sixty parts of polyvinyl chloride and 40 parts of dioctyl phthalate are mixed in a rolling mill to a homogeneous blend. During the processing some fuming occurs and some discoloration becomes apparent. When a molded sheet is heated at 325° F. for 30 minutes, the clarity of the sheet becomes poorer and discoloration becomes noticeable. When ten parts of the dioctyl phthalate are replaced in the formula by monomer H, no discoloration or fuming is noticed during the milling and when a molded film is tested at 325° F. for 30 minutes, the clarity and color of the molded product remains substantially unchanged.

Copolymers of vinyl chloride 50—50 with vinyl acetate, and 50—50 methyl methacrylate, respectively, are used in place of polyvinyl chloride with similar results.

Similar results are also obtained when monomers A, B, C, D, and G, respectively, are used instead of monomer H.

While certain features of this invention have been described in detail with respect to various embodiments thereof, it will, of course, be apparent that other modifications can be made within the spirit and scope of this invention, and it is not intended to limit the invention to the exact details shown above, except insofar as they are defined in the following claims.

The invention claimed is:

1. A composition of matter consisting essentially of a polymerization product of a polymerizable mass comprising at least one monomer of the structure

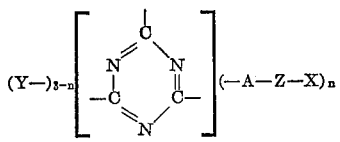

wherein n is an integer having a value of at least 1 and not more than 3; A is a divalent radical selected from the class consisting of —O—, —S—, and —NR—; R is selected from the class consisting of hydrogen and hydrocarbon radicals containing no more than about 14 carbon atoms therein; Z is a divalent aromatic hydrocarbon radical containing no more than about 20 carbon atoms therein; X represents an oxirane-alkyl radical containing no more than about 20 carbon atoms therein; and Y represents a monovalent radical.

2. A composition of claim 1, in which said monomer is

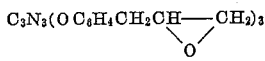

3. A composition of claim 1, in which said monomer is

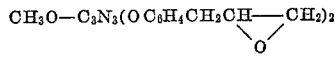

4. A composition of claim 1, in which said monomer is

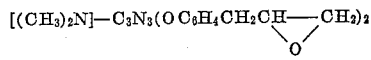

5. A composition of claim 1, in which said monomer is

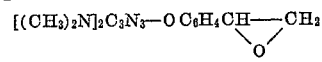

6. A composition of claim 1, in which said monomer is

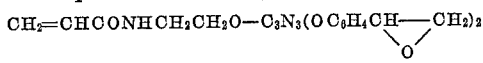

7. A composition of claim 1, in which said monomer is

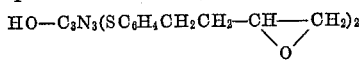

8. A composition of claim 1, in which said monomer is

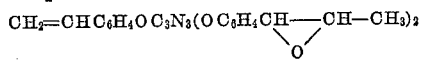

9. A composition of claim 1, in which said monomer is

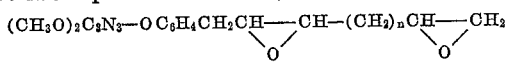

10. A composition of claim 9, in which said polymerizable mass also comprises an unsaturated alkyd resin having aliphatic unsaturation therein.

11. A composition of claim 1, in which said polymerization product is a polymerization product in which said polymerizable mass comprises at least one other copolymerizable monomer.

12. A copolymerization product of claim 11, in which said other copolymerizable monomer is an unsaturated alkyd resin having aliphatic unsaturation therein.

13. A composition of claim 11, in which said copolymerizable monomer is a vinyl monomer.

14. A composition of claim 13, in which said vinyl monomer is styrene.

15. A composition of claim 13, in which said vinyl monomer is acrylonitrile.

16. A composition of claim 11, in which said copolymerizable monomer is ethyl methacrylate.

17. A composition of claim 11, in which said polymerizable mass comprises an unsaturated alkyd resin having aliphatic unsaturation therein and another copolymerizable monomer.

18. A composition of claim 17, in which said copolymerizable monomer is styrene.

19. A compound having the formula

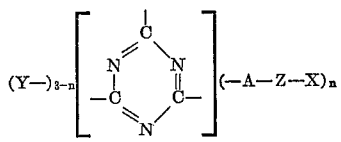

wherein n is an integer having a value of at least 1 and not more than 3; A is a divalent radical selected from the class consisting of —O—, —S—, and —NR—; R is selected from the class consisting of hydrogen and hydrocarbon radicals containing no more than about 14 carbon atoms therein; Z is a divalent aromatic hydrocarbon radical containing no more than about 20 carbon atoms therein; X represents an oxirane-alkyl radical containing no more than about 20 carbon atoms therein; and Y represents a monovalent radical.

20. A compound having the formula

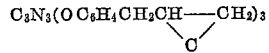

21. A compound having the formula

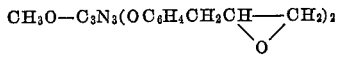

22. A compound having the formula

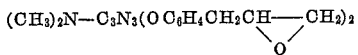

23. A compound having the formula

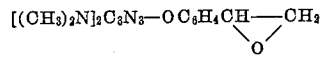

24. A compound having the formula

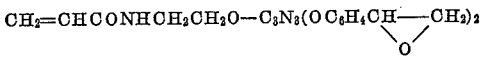

References Cited in the file of this patent

UNITED STATES PATENTS 2,810,706   Frazier et al.   Oct. 22, 1957
2,917,493   Phillips et al.   Dec. 15, 1959

FOREIGN PATENTS 773,874   Great Britain   May 1, 1957